United States Patent
Debevec et al.

(10) Patent No.: US 10,099,644 B2
(45) Date of Patent: Oct. 16, 2018

(54) VIRTUAL HEAD MOUNTED VIDEO CAMERA SYSTEM

(71) Applicants: Paul E. Debevec, Culver City, CA (US); Mark Bolas, Los Angeles, CA (US); Graham L. Fyffe, Los Angeles, CA (US)

(72) Inventors: Paul E. Debevec, Culver City, CA (US); Mark Bolas, Los Angeles, CA (US); Graham L. Fyffe, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 434 days.

(21) Appl. No.: 14/723,066

(22) Filed: May 27, 2015

(65) Prior Publication Data

US 2015/0350537 A1 Dec. 3, 2015

Related U.S. Application Data

(60) Provisional application No. 62/003,332, filed on May 27, 2014.

(51) Int. Cl.
*H04N 5/232* (2006.01)
*B60R 21/2165* (2011.01)
(Continued)

(52) U.S. Cl.
CPC .... *B60R 21/2165* (2013.01); *B29C 45/14065* (2013.01); *B29C 45/14508* (2013.01); *B29C 45/1657* (2013.01); *B29C 45/26* (2013.01); *B60R 13/0256* (2013.01); *B60R 21/205* (2013.01); *B60R 21/215* (2013.01);
(Continued)

(58) Field of Classification Search
CPC ........... H04N 5/23219; H04N 5/23296; H04N 5/23261; H04N 7/181; G01S 3/7864
See application file for complete search history.

(56) References Cited

U.S. PATENT DOCUMENTS 5,717,512 A * 2/1998 Chmielewski, Jr. ........................
G02B 26/0816
348/E13.005
7,127,081 B1 * 10/2006 Erdem ............... G06K 9/00228
348/169

(Continued)

OTHER PUBLICATIONS

Lamm, R. et al. 2001. Real-Time Reinforcement Learning for Target Tracking. In Smart Engineering System Design: Neural Networks, Fuzzy Logic, Evolutionary Programming, data Mining and Complex Systems, vol. 11, Proceedings of the Artificial Neural Networks in Engineering Conference [ANNIE 2001], held Nov. 4-7, 2001, St. Louis. Missouri, pp. 57-62.

(Continued)

*Primary Examiner* — Shawn An
(74) *Attorney, Agent, or Firm* — McDermott Will & Emery LLP; Marc E. Brown

(57) ABSTRACT

A facial image capture system may capture images of a face of a person while the person is moving. A video camera may capture sequential images of a scene to which the video camera is directed. A marker-based location detection system may determine and generate information about the location of a marker worn on or close to the face of the person. A camera control system may automatically adjusts both the horizontal and vertical direction to which the video camera is directed so as to cause the sequential images of the camera to each be of the face of the person while the person is moving, based on the information about the location of the marker from the marker-based location detection system.

13 Claims, 4 Drawing Sheets

(51) Int. Cl.
*G01S 3/786* (2006.01)
*B60R 21/215* (2011.01)
*H04N 5/247* (2006.01)
*B29C 45/14* (2006.01)
*B29C 45/16* (2006.01)
*B29C 45/26* (2006.01)
*B60R 13/02* (2006.01)
*B60R 21/205* (2011.01)
*H04N 7/18* (2006.01)
*B29K 101/12* (2006.01)
*B29K 105/04* (2006.01)
*B29K 105/00* (2006.01)
*B29L 9/00* (2006.01)
*B29L 31/30* (2006.01)

(52) U.S. Cl.
CPC ......... *G01S 3/7864* (2013.01); *H04N 5/23219* (2013.01); *H04N 5/23296* (2013.01); *H04N 5/247* (2013.01); *B29C 2045/1454* (2013.01); *B29C 2045/1664* (2013.01); *B29K 2101/12* (2013.01); *B29K 2105/04* (2013.01); *B29K 2105/256* (2013.01); *B29K 2623/0608* (2013.01); *B29K 2623/12* (2013.01); *B29L 2009/00* (2013.01); *B29L 2031/3008* (2013.01); *B29L 2031/3038* (2013.01); *H04N 5/23261* (2013.01); *H04N 7/181* (2013.01)

(56) References Cited

U.S. PATENT DOCUMENTS

| | | | | |
|---|---|---|---|---|
| 7,440,594 | B2 * | 10/2008 | Takenaka | G08B 13/1961 382/118 |
| 2005/0013507 | A1 * | 1/2005 | Lee | G06K 9/6255 382/284 |
| 2005/0213113 | A1 * | 9/2005 | Sikora | G01B 11/2433 356/638 |
| 2006/0171453 | A1 * | 8/2006 | Rohlfing | G08B 13/19632 375/240.01 |
| 2006/0204050 | A1 * | 9/2006 | Takizawa | G06K 9/00288 382/115 |
| 2008/0118156 | A1 * | 5/2008 | Okada | G06K 9/00228 382/195 |
| 2009/0086032 | A1 * | 4/2009 | Li | G03B 29/00 348/208.1 |
| 2009/0115864 | A1 * | 5/2009 | Ogawa | G06K 9/00248 348/222.1 |
| 2010/0067893 | A1 * | 3/2010 | Iwasaki | H04N 5/23293 396/147 |
| 2014/0015981 | A1 * | 1/2014 | Dietl | H04N 7/18 348/159 |

OTHER PUBLICATIONS

Okumura, K. et al. 2011. High-speed Gaze Controller for Millisecond-order Pan/tilt Camera. 2011 IEEE International Conference on Robotics and Automation, Shanghai International Conference Center, May 9-13, 2011, Shanghai, China, pp. 6186-6191.

Fyffe, G. et al. 2014. Driving High-Resolution Facial Scans with Video Performance Capture. ACM Transactions on Graphics, 34(1), Nov. 2014.

Kuhn, H. W. 1955. The Hungarian Method for the assignment problem. Naval Research Logistics Quarterly, 2: 83-97.

* cited by examiner

VIRTUAL HEAD MOUNTED VIDEO CAMERA SYSTEM

CROSS-REFERENCE TO RELATED APPLICATION

This application is based upon and claims priority to U.S. provisional patent application 62/003,332, entitled "VIRTUAL HEAD MOUNTED CAMERA," filed May 27, 2014. The entire content of this application is incorporated herein by reference.

STATEMENT REGARDING FEDERALLY SPONSORED RESEARCH

This invention was made with government support under Grant No. W911NF-04-D-0005, awarded by the Army Research Office (ARO). The government has certain rights in the invention.

BACKGROUND

Technical Field

This disclosure relates to facial motion capture systems that record facial performances of an actor in a fashion suitable for transfer onto digital characters.

Description of Related Art

Facial motion capture systems use a variety of techniques to record facial performances of an actor in a manner suitable for transfer onto digital characters.

Marker-based motion capture systems record the trajectories of a set of dots or markers on the performer's face and body, typically using a set of cameras fixed to a gantry around the perimeter of a performance volume. If the volume is large, the physical spacing of the cameras may limit the spatial resolution of facial performance that can be captured. If the volume is small, the range of motion of the actor may be restricted.

Alternative designs mount the cameras directly in front of the performer's face using a head-mounted device, such as a helmet with an arm attached to hold one or more cameras pointing at the actor's face. This can improve the resolution of the facial performance, since the cameras record a full view of the face, while still allowing the performer to move freely within the performance capture volume. However, the physical presence of the cameras may introduce discomfort to the actors, and may physically interfere with actions that the actors are to perform.

Markerless motion capture systems also exist for facial motion capture. Such systems employ similar camera arrangements as marker-based capture systems, but record motion based on tracking the natural facial texture of the actor, sometimes augmented with textured makeup. While the lack of markers may improve the density of the recorded information, the same problems in terms of range of motion, comfort, and physical interference may persist.

SUMMARY

A facial image capture system may capture images of a face of a person while the person is moving. A video camera may capture sequential images of a scene to which the video camera is directed. A marker-based location detection system may determine and generate information about the location of one or more markers worn on or close to the face of the person. A camera control system may automatically adjust both the horizontal and vertical direction to which the video camera is directed so as to cause the sequential images of the camera to each be of the face of the person while the person is moving, based on the information about the location of the markers from the marker-based location detection system.

The video camera may include a lens. The camera control system may include a pan mirror in front of the lens that controls the horizontal direction to which the video camera is directed and/or a tilt mirror in front of the lens that controllably the vertical direction to which the video camera is directed.

The video camera may include a zoom. The camera control system may automatically adjust the zoom of the video camera so as to cause the size of the face in the images to remain substantially constant while the person is moving, based on the information about the location of the markers.

The video camera may have a focus. The camera control system may automatically adjust the focus of the video camera so as to cause the face in the images to be in focus while the person is moving, based on the information about the location of the markers.

The facial capture system may include at least two video cameras that each capture sequential images of a scene to which each video camera is directed. The camera control system may automatically adjust both the horizontal and vertical direction to which each video camera is directed so as to cause the sequential images of the video cameras to each be of the face of the person from a different perspective while the person is moving, based on the information about the location of the markers. The facial capture system may include an image processing system that generates a three dimensional model and/or a front-facing image of the face for each of the images.

The image processing system may generate an animated performance of a virtual character that mimics the movement of the face in the images.

The video camera may have a mechanical or electronic shutter that opens and closes during the capture of each of the images. The facial image capture system may include a lighting controller that causes lighting directed to the face of the person while the person is moving to be delivered in pulses that are synchronized with the opening of the shutter.

The facial image capture system may be used to capture the face of a first and a second person while each of them is moving independently of the other. The facial capture system may include multiple video cameras that each capture sequential images of a scene to which each video camera is directed. The marker-based location detection system may determine and generate information about the location of a marker or markers worn on or close to the face of each of the persons. The camera control system may automatically adjust both the horizontal and vertical direction to which each video camera is directed so as to cause some of the sequential images to be of the face of the first person while the first person is moving and others of the sequential images to be of the face of the second person while the second person is moving, based on the information about the location of the markers worn on or close to the face of the first and the second persons.

The camera control system may continually determine which of the video cameras is best positioned for capturing sequential images of the face of the first person and which of the video cameras is best positioned for capturing the face of the second person based on the information about the location of the markers. The camera control system may automatically adjust both the horizontal and vertical direction to which each video camera is directed based on this continual determination so that the camera determined to be best positioned for capturing images of the face of the first person captures images of the face of the first person while the first person is moving and the camera determined to be best positioned for capturing images of the face of the second person captures images of the face of the second person while the second person is moving.

The multiple video cameras may include at least four video cameras. The camera control system may automatically adjust both the horizontal and vertical direction to which the video cameras are directed based on the information about the location of the markers so as to cause the sequential images of at least two of the video cameras to be of the face of the first person from different perspectives and the sequential images of at least two of the video cameras to be of the face of the second person from different perspectives.

The information about the position of the markers may be used by the camera control system to predict which of the video cameras will be able to see the face of each of the persons, notwithstanding occlusions that may block the view of others of the cameras.

The information about the position of the markers may be used by the camera control system to cause a first of the video cameras but not a second of the video cameras to capture sequential images of the face of the first person during a first time period and the second of the video cameras but not the first of the video cameras to capture sequential images of the face of the first person during a second time period.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
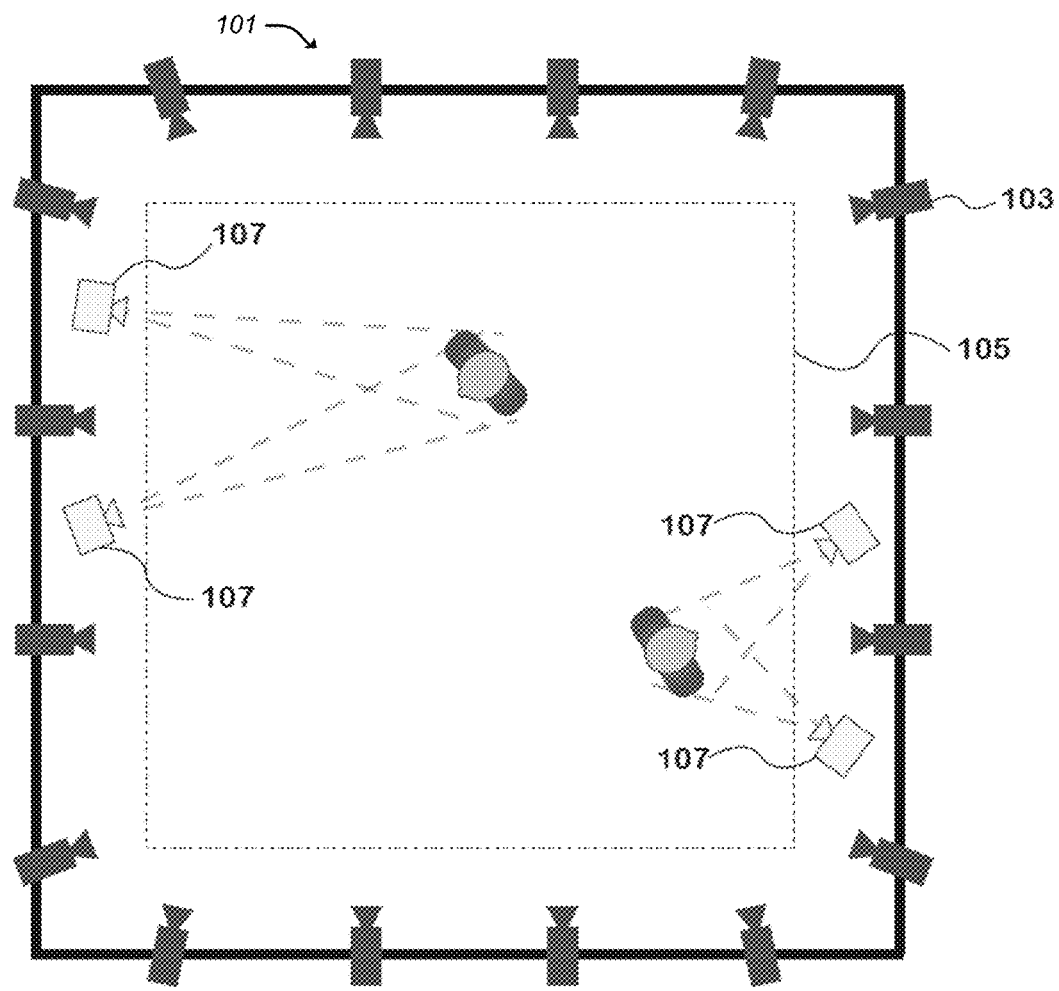
FIG. 1 illustrates an example of a facial capture system that captures a sequence of images of the faces of actors during the course of their performance.

FIG. 1 illustrates an example of a facial capture system 101 that captures a sequence of images of the faces of actors during the course of their performance. As illustrated in FIG. 1, the facial capture system may include a marker-based motion detection system 103, a motion capture volume 105, and multiple controllable video cameras 107. Although two actors are illustrated, there could be a different number such as one or three.

The marker-based location detection system 103 may determine the location of one or more optical markers attached to the actors, such as attached to their faces or very near their faces, typically using an array of cameras at fixed locations surrounding the motion capture volume 105. The marker-based location detection system 103 may utilize the image taken by these cameras to detect and determine the location of the markers.

The motion capture volume 105 may be a volume of space in which the actors perform, such as a stage.

Each controllable video camera 107 may include a video camera and a mechanism to control the view of the video camera, such as its pan, tilt, zoom, and/or focus. The pan and tilt may be controlled by moving the camera to control the direction at which it points and/or with electronically actuated pan and tilt mirrors.

The multiple controllable video cameras 107 may be placed around the motion capture volume 105.

Figure 2:
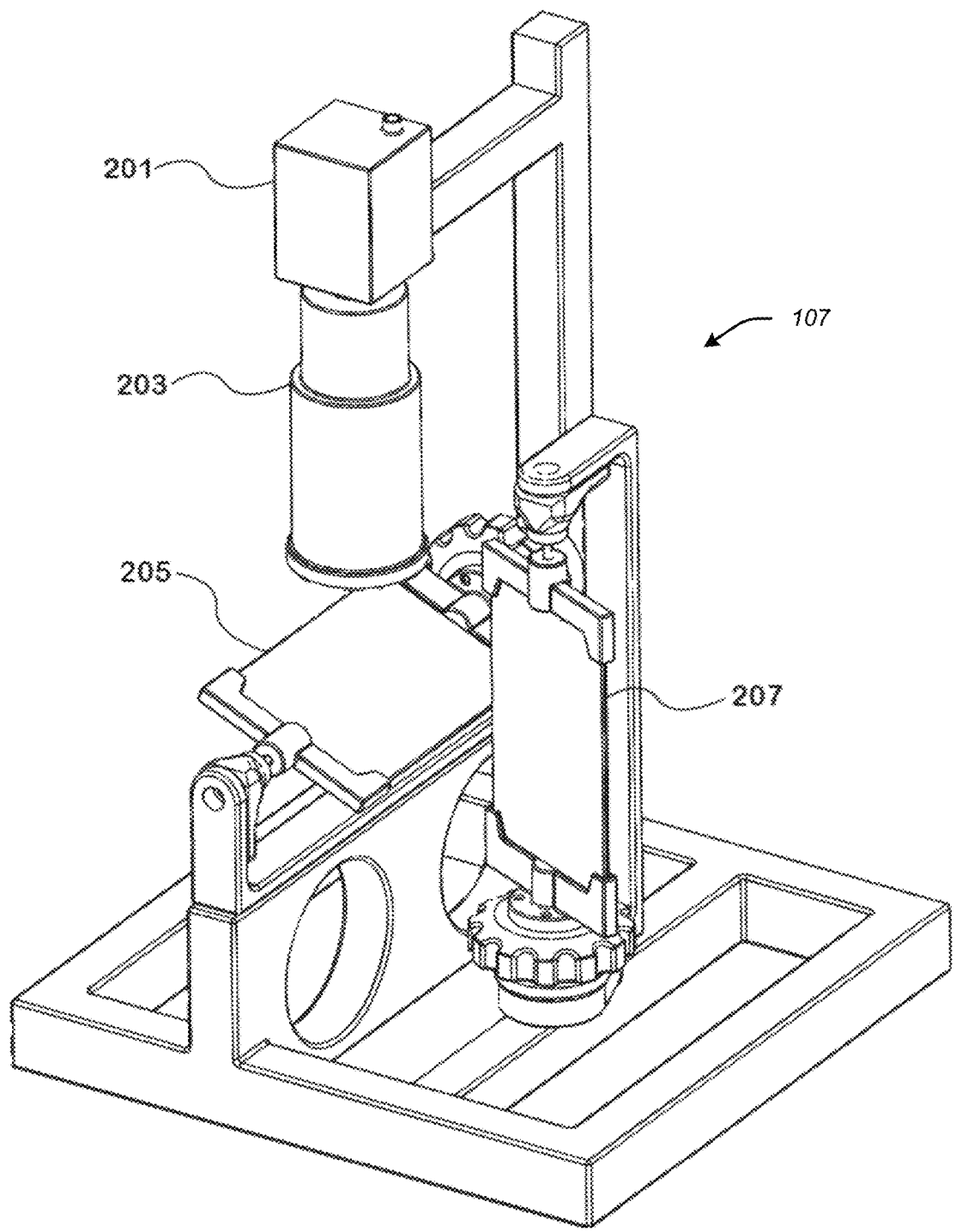
FIG. 2 illustrates an example of a controllable video camera that utilizes a controllable tilt and pan mirror to control the direction to which the camera is directed.

FIG. 2 illustrates an example of a controllable video camera 107 that may utilize an electronically controllable tilt mirror 205 and an electronically controllable pan mirror 207 placed in from of a lens 203 of the camera 201 to control the direction to which the camera 201 is directed. The camera 201 may be a high definition video camera that records image sequences over time and stores these images on media and/or outputs the images to an image processing system.

Figure 5:
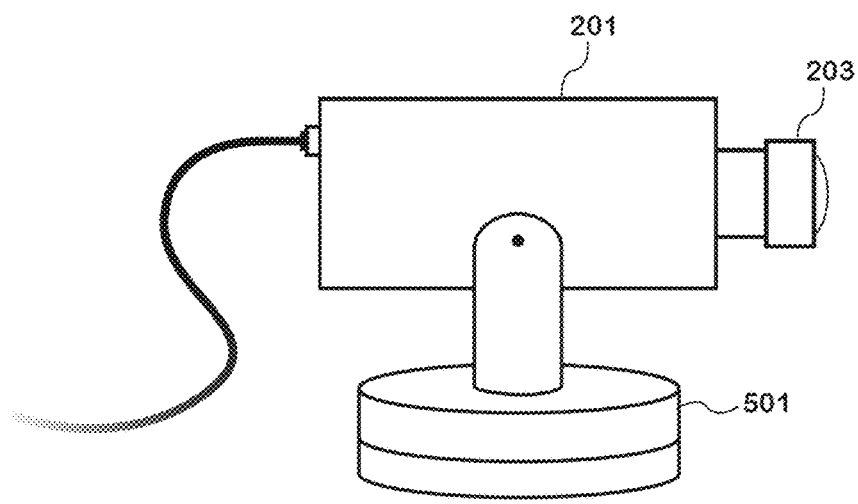
FIG. 5 illustrates an example of a controllable video camera that utilizes a motor controlled mount to control the pan and tilt of the video camera.

FIG. 5 illustrates an example of a controllable video camera that utilizes a controllable motor controlled mount 501 to control the pan and/or tilt of a video camera 201 having a lens 203.

The facial image capture system 101 may capture both facial and body motion of one or more actors performing in the motion capture volume 105. The marker-based location detection system 103 may be a standard marker-based location detection system that records the body motion and overall head motion of each actor and determines the location of a part of the actor. The marker-based location detection system 103 may determine and provide an estimated 3D position of each actor's head.

Figure 6:
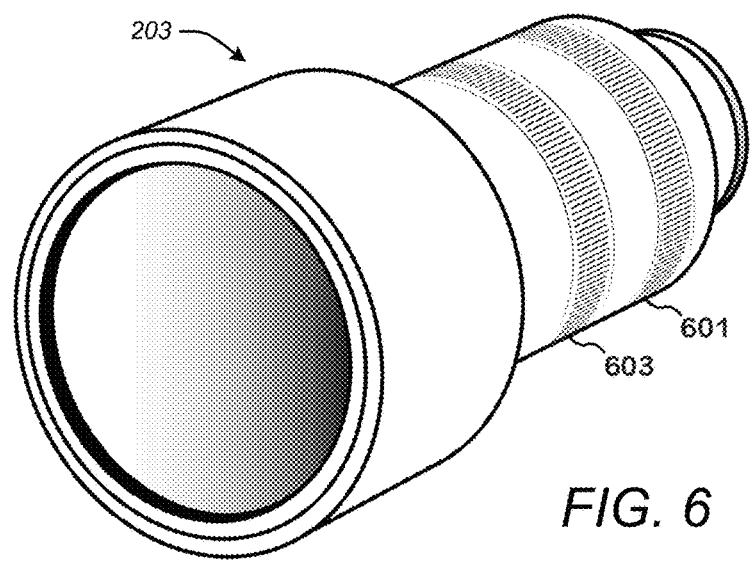
FIG. 6 illustrates an example of a lens that has controllable zoom and focus and that may be used in the controllable video cameras illustrated in FIGS. 1, 2, and/or 5.
Figure 7:
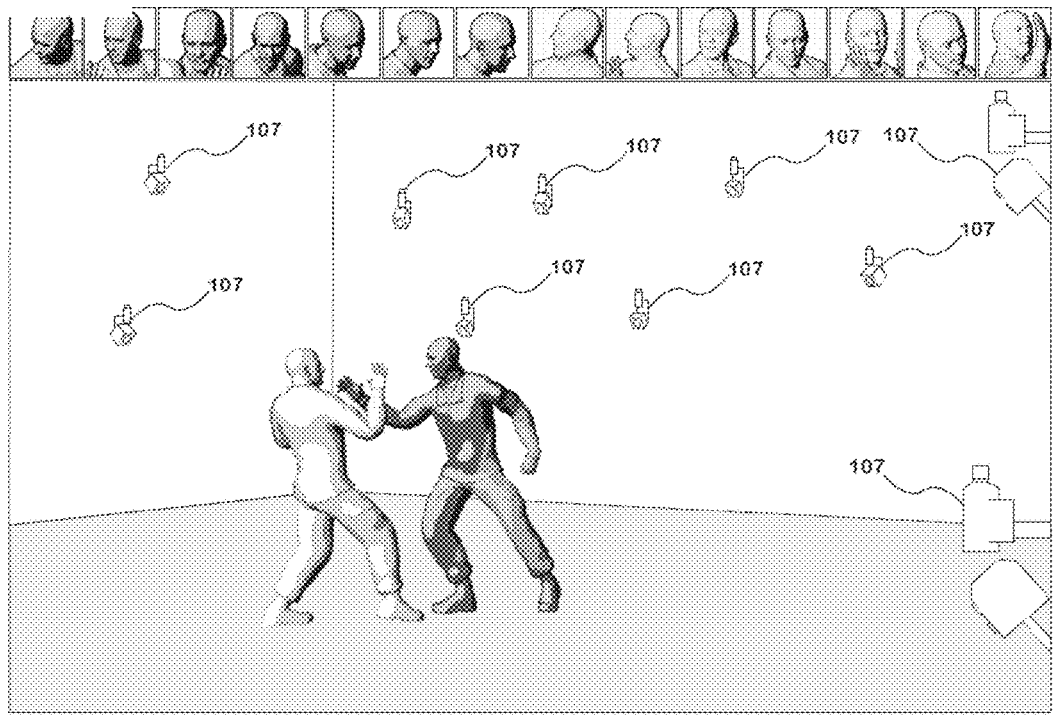
FIG. 7 illustrates an example of the faces of multiple actors being captured during a performance by a facial capture system.

FIG. 6 illustrates an example of a lens that has controllable zoom control 601 and a controllable focus control 603 that may be used in the controllable video cameras illustrated in FIGS. 1, 2, and/or 5. The zoom and focus controls may be motor driven.

Figure 4:
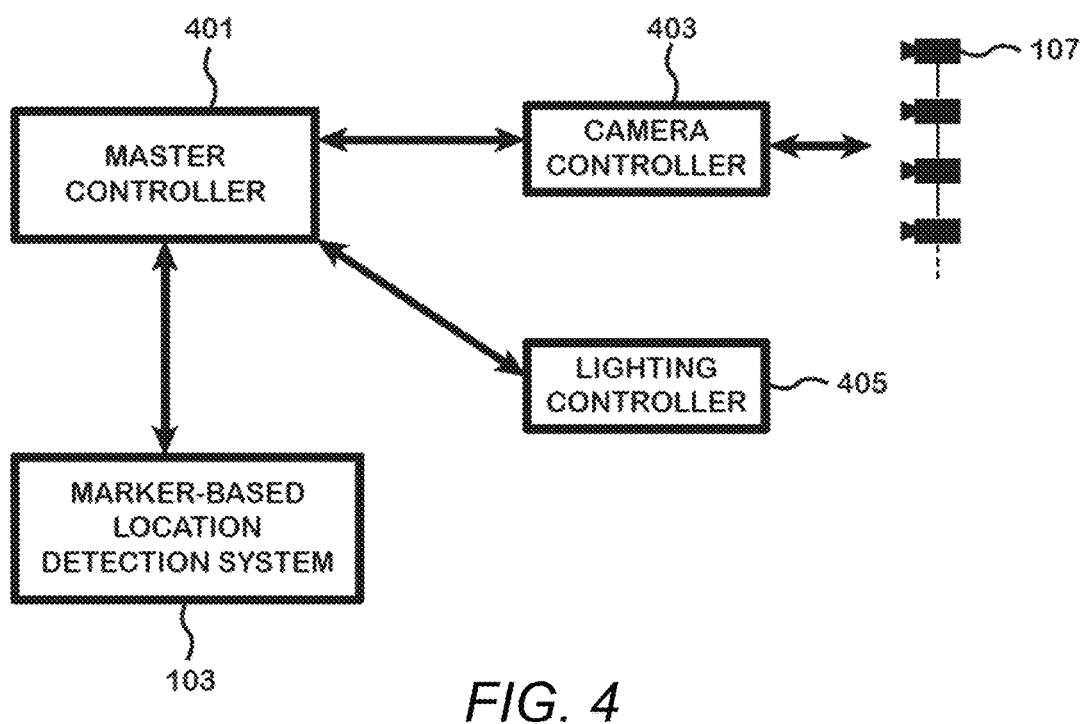
FIG. 4 illustrates a block diagram of an example of a facial capture system that captures a sequence of images of an actor's face during the course of an actor's performance.

FIG. 4 illustrates an example of a block diagram of a facial capture system that captures a sequence of images of an actor's face during the course of an actor's performance. The facial capture system may include a master controller 401, a camera controller 403, a lighting controller 405, and the marker-based location detection system 103. The master controller 401 may be a control system that controls the marker-based location detection system 103, the camera controller 403, and the lighting controller 405 in concert to effectuate one or more of the processes described herein. The camera controller 403 may be a control system that controls the controllable video cameras 107 so that they record under a given speed and store the image sequences to media. The camera controller 403 may control the zoom and/or focus of the video cameras and the pan and tilt mount or mirrors of each video camera, again so as to effectuate the image capture processes describe herein. The lighting controller 405 may be a light controller that controls and synchronizes light sources with shutters of the controllable video cameras to reduce motion blur, as explained in more detail below.

The master controller 401 may signal the camera controller 403 to cause a subset of the controllable video cameras 107 to pan, tilt, and zoom such that the actor's head remains at the center and occupies a large portion of the view, based on the estimated 3D position of the head from the marker-based location detection system 103.

The master controller 401 may employ multiple subsets of the controllable video cameras 107 to track the faces of multiple actors simultaneously, using an algorithm to determine which controllable video cameras 107 should track which actors at any moment in time. An example of such an algorithm is described below.

Figure 3:
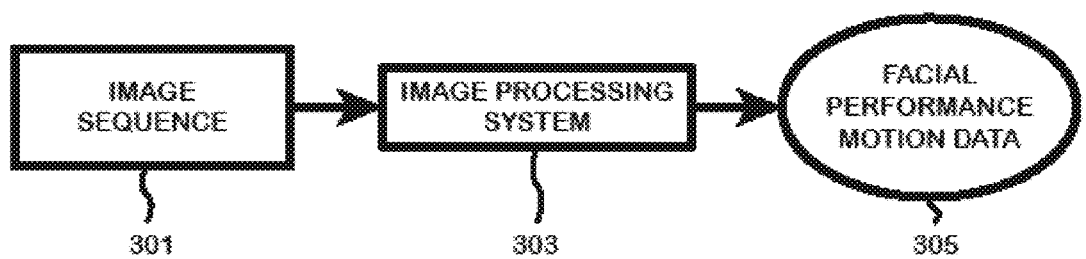
FIG. 3 illustrates an example of a system for generating data describing three-dimensional movement of each part of an actor's face during a performance.

FIG. 3 illustrates an example of a system for generating data describing three-dimensional movement of each part of an actor's face during a performance. As illustrated in FIG. 3, the system may include image sequence 301, an image processing system 303, and generated facial performance data 305. The image sequence 301 may be a sequence of images captured by the controllable video cameras 107 during the actor's performance. The image processing system 303 may process a sequence of images of the actor's face to produce facial performance motion data using image analysis. The facial performance motion data 305 may describe three-dimensional movement of each part of an actor's face throughout a performance, for example the trajectories of several thousand imaginary points distributed over the face.

The facial image capture system 101 may record high resolution images of the bodies and faces of the performers within the motion capture volume 105, without having to physically attach any camera to the performers. The facial image capture system 101 may provide multiple images of each actor's face from a useful variety of directions (e.g. from a front, a ¾ view from the left, and a ¾ view from the right) as they perform in the scene. This may allow for a three-dimensional model of the actor's face to be generated and later viewed relatively directly from the recorded image data.

With physically attached cameras, this may be straightforward to do, since cameras can be attached to the arms of a head-mounted apparatus and may generally maintain their position and distance relative to the actor's face as the performance progresses. When using the facial image capture system 101, the controllable video cameras systems 107 may be placed around the periphery of the motion capture volume 105. They may be continuously aimed toward the faces of the performers by the camera controller 403, under the control of the master controller 401, based on location data from the marker-based location detection system 103. Comparable image information as to what would have been seen from head-mounted cameras may be recorded and analyzed to construct the facial performance motion data 305.

The controllable video cameras 107 may be placed at fixed positions around the periphery of the motion capture volume 105. This may create a camera assignment problem to determine which of the controllable video cameras 107 should aim toward which of the actors. The camera assignments that would be optimal at one instant of time may not necessarily be optimal as the actors look in different directions and move in the motion capture volume 105 relative to each other.

Thus, an algorithm may be needed to continuously assign the controllable video cameras 107 to actors based on the information available from the marker-based location detection system 103 about their head locations so that each actor can have an appropriate number of controllable video cameras 107 assigned to them. Several factors can be considered and managed by this algorithm, including:

1. As an actor moves their head to point in different directions, their face may aim toward different controllable video cameras 107. Thus, the controllable video cameras 107 which were once assigned to the actor when they were looking toward the north may be of greater use pointing toward other actors when they look toward the south.

2. There may be multiple actors in the motion capture volume 105. The assignment algorithm may need to make sure that each actor has enough controllable video cameras 107 observing their facial performance to allow for adequate performance capture.

3. A star actor may require greater fidelity to their digital character's facial performance motion data 305, so more of the controllable video cameras 107 may be aimed toward their face at any given moment. Some actors may not even need facial capture for a particular scene, so no cameras aimed toward them may be required.

4. The view that a controllable video cameras 107 can have of an actor's face can become blocked by props, scenery, or the heads and bodies of other actors (or even the actor him/herself). During such moments, different controllable video cameras 107 may need to be assigned in order to provide an optimal number of views and viewpoints.

5. A finite amount of time may be required to adjust the zoom 601, focus 603, pan/tilt mount 501 or pan mirror 207 and tilt mirror 205 of the controllable video cameras 107 in order to properly frame and focus on a particular actor. Thus, re-assigning one of the controllable video cameras 107 may need to be done during a period of time when the facial performances are being tracked sufficiently by other controllable video cameras 107.

6. Facial performance analysis algorithms may perform better when the number and position of the views is relatively consistent. So, to the extent possible, the controllable video cameras 107 should try to stay on a given actor without switching back and forth frequently.

7. It may be known beforehand where a virtual camera for rendering the scene will eventually be placed, and it may be of interest that each of the actors' faces are seen approximately from the virtual camera view.

A variety of different algorithms may be used to continuously assign the controllable video cameras 107 to actors based on the information from the marker-based location detection system 103 indicating the position and orientation of each actor's head in the motion capture volume 105. The algorithm may be configured to effectuate one or more of the goals discussed above. The algorithm may be implemented by the master controller 401 through a software program run in the master controller 401.

An example of such an algorithm is the following:

1. Assign to each actor a number of facial regions, such that the regions partition the face into roughly equal vertical slices, and the total number of regions across all actors sums to N, where N is equal to the number of the controllable video cameras 107. More important actors may be assigned a greater number of regions than less important actors. Optionally, the actor's performance may trigger specific facial regions to be assigned. For example, if an actor is speaking, a greater number of regions around the mouth may be assigned.

2. Assign each of the controllable video cameras 107 to one facial region of one actor from (1) using, for example, the Hungarian algorithm for maximum weighted bipartite graph matching [Kuhn 1955] Harold W. Kuhn, "The Hungarian Method for the assignment problem", Naval Research Logistics Quarterly, 2: 83-97, 1955. The weight associated with assigning one of the controllable video cameras 107 to a region of actor A's face may be 0 if the controllable video camera 107 does not have a clear view of the facial region, as estimated using the location of all actors reported by the marker-based location detection system 103, including occlusion and the direction that the face is pointing. Otherwise, the weight may be an estimate of the projected area of the facial region of actor A on one of the controllable video cameras 107 image plane (allowing for changes in zoom). If one of the controllable video cameras 107 is currently assigned to some facial region of a different actor B, the weight may be reduced by a re-tasking cost. This may be equal to K times the projected area of the facial region of actor B on the controllable video camera 107 image plane. K may be chosen to represent the number of video frames that will be corrupted by camera motion during re-tasking. This may, for example, be 3 or more than 3 if a significant change in zoom is required. Optionally, the actor's performance may influence the associated weights, for example if an actor is speaking, a greater weight may be assigned to the controllable video cameras 107 that views the mouth from a side profile angle, or from the front, with lesser weight for the controllable video cameras 107 having other viewing angles.

3. If any of the controllable video cameras 107 are assigned in step (2) to actors where there is no clear view of the face, steps 1-3 of the algorithm may be repeated considering only those controllable video cameras 107 assigned to actors where there is no clear view of the face, and using additional facial regions inserted in between the facial regions from previous iterations. Occlusion may be estimated, for example, by rasterizing an approximate 3D body model for each actor positioned according to the information available from the marker-based location detection system 103 and an approximate 3D model for each prop into a depth buffer associated with each camera view, and then rasterizing each individual region of the face on the approximate 3D body model of each actor, comparing the depth of the rasterized region against the depth stored in the depth buffer to determine if the region is occluded or partially occluded by an object having a lesser depth value.

4. If, after iterating steps 1-3 exhaustively, there remain controllable video cameras 107 not assigned to actors with a clear view of the face, such controllable video cameras 107 may remain assigned to the same actor as before, despite not having a clear view. Actor motion may allow a clear view again in the future.

The facial image capture system 101 may include different or additional components. For example, the lighting controller 405 may be employed to reduce motion blur in the recorded images. The lighting controller 405 may synchronize light sources with the shutters of the controllable video cameras 107 such that light is only emitted during the opening of the shutter. The light sources may be pulsed under very high intensity and the controllable video cameras 107 may only be exposed during that short period of time. This may reduce motion blur, while still providing a useful image brightness level. Given that the light sources are only on for very short amount of time, the average energy that is received by the actors' eyes may stay within safe limits, despite a strong momentary intensity.

The image processing system 303 may process the image sequences 301 captured by the video cameras 201 to estimate facial performance motion data 305 describing the three-dimensional movement of each part of an actor's face throughout a performance, for example, the trajectories of several thousand imaginary points distributed over the face. The system may employ facial trajectory estimation algorithms such as found in [Fyffe 2014] Graham Fyffe, Andrew Jones, Oleg Alexander, Ryosuke Ichikari, "Driving High-Resolution Facial Scans with Video Performance Capture", ACM Transactions on Graphics, 34(1), November 2014.

The master controller 401 may be responsible for manipulating all the components including the marker-based location detection system 103, the camera controller 403, and the lighting controller 405. The master controller 401 may receive target location data from the marker-based location detection system 103, make decisions for tracking based on an algorithm, such as the one described above, and dispatch control signals to the sub-system controllers as needed to effectuate this control.

The image processing system, master controller, camera controller, and lighting controller that have been discussed herein may be implemented with one or more computer systems configured to perform the functions that have been described herein for the component. Each computer system may include one or more processors, tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

Each computer system may include one or more computers at the same or different locations. When at different locations, the computers may be configured to communicate with one another through a wired and/or wireless network communication system.

Each computer system may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the computer system, as recited herein. The description of each function that is performed by each computer system also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and/or advantages. These also include embodiments in which the components and/or steps are arranged and/or ordered differently.

For example, the motion capture volume 105 may be indoors or outdoors; the number of controllable video cameras may be a different number, for example 1 or 3 or more; and the location of the controllable video cameras may be changed during a performance.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A facial image capture system for capturing images of a face of a person while the person is moving comprising:
   a video camera that captures sequential images of a scene to which the video camera is directed;
   a marker-based location detection system that determines and generates information about the location of a marker worn on or close to the face of the person; and
   a camera control system that automatically adjusts both the horizontal and vertical direction to which the video camera is directed so as to cause the sequential images of the camera to each be of the face of the person while the person is moving, based on the information about the location of the marker from the marker-based location detection system,
   wherein:
      the facial image capture system is used to capture the face of a first and a second person while each of them is moving independently of the other;
      the facial capture system includes multiple video cameras that each capture sequential images of a scene to which each video camera is directed;
      the marker-based location detection system determines and generates information about the location of a marker worn on or close to the face of each of the persons;
      the camera control system automatically adjusts both the horizontal and vertical direction to which each video camera is directed so as to cause some of the sequential images to be of the face of the first person while the first person is moving and others of the sequential images to be of the face of the second person while the second person is moving, based on the information about the location of the marker worn on or close to the face of the first and the second persons; and
      at least one of the following:
         the camera control system: continually determines which of the video cameras is best positioned for capturing sequential images of the face of the first person and which of the video cameras is best positioned for capturing the face of the second person based on the information about the location of a markers; and automatically adjusts both the horizontal and vertical direction to which each video camera is directed based on this continual determination so that: the camera determined to be best positioned for capturing images of the face of the first person captures images of the face of the first person while the first person is moving; and the camera determined to be best positioned for capturing images of the face of the second person captures images of the face of the second person while the second person is moving; or the multiple video cameras include at least four video cameras; and the camera control system automatically adjusts both the horizontal and vertical direction to which the video cameras are directed based on the information about the location of the markers so as to cause: the sequential images of at least two of the video cameras to be of the face of the first person from different perspectives; and the sequential images of at least two of the video cameras to be of the face of the second person from different perspectives; or the information about the position of the markers is used by the camera control system to predict which of the video cameras will be able to see the face of each of the persons, notwithstanding occlusions that will block the view of others of the cameras; or the information about the position of the markers is used by the camera control system to cause: a first of the video cameras but not a second of the video cameras to capture sequential images of the face of the first person during a first time period; and the second of the video cameras but not the first of the video cameras to capture sequential images of the face of the first person during a second time period.

2. The facial image capture system of claim 1 wherein the video camera includes a lens and the camera control system includes in front of the lens:
   a pan mirror that controls the horizontal direction to which the video camera is directed; and
   a tilt mirror that controllably the vertical direction to which the video camera is directed.

3. The facial image capture system of claim 1 wherein:
the video camera includes a zoom; and
the camera control system automatically adjusts the zoom of the video camera so as to cause the size of the face in the images to remain substantially constant while the person is moving, based on the information about the location of the marker.

4. The facial image capture system of claim 1 wherein:
the video camera has a focus; and
the camera control system automatically adjusts the focus of the video camera so as to cause the face in the images to be in focus while the person is moving, based on the information about the location of the marker.

5. The facial image capture system of claim 1 wherein:
the facial capture system includes at least two video cameras that each capture sequential images of a scene to which each video camera is directed;
the camera control system automatically adjusts both the horizontal and vertical direction to which each video camera is directed so as to cause the sequential images of the video cameras to each be of the face of the person from a different perspective while the person is moving, based on the information about the location of the marker; and
the facial capture system includes an image processing system that generates a three dimensional model of the face for each of the images.

6. The facial image capture system of claim 1 wherein:
the facial capture system includes at least two video cameras that each capture sequential images of a scene to which each video camera is directed;
the camera control system automatically adjusts both the horizontal and vertical direction to which each video camera is directed so as to cause the sequential images of the video cameras to each be of the face of the person from a different perspective while the person is moving, based on the information about the location of the marker; and
the facial capture system includes an image processing system that generates a front-facing image of the face for each of the images.

7. The facial image capture system of claim 1 wherein:
the sequential images capture movement of the face; and
the facial image capture system includes an image processing system that generates facial performance motion data based on the images of the face that is usable to cause a face of a virtual character to mimic the movement of the face that is captured in the images.

8. The facial image capture system of claim 7 wherein the image processing system generates an animated performance of a virtual character that mimics the movement of the face in the images.

9. The facial image capture system of claim 1 wherein:
the video camera has a mechanical or electronic shutter that opens and closes during the capture of each of the images; and
the facial image capture system includes a lighting controller that causes lighting directed to the face of the person while the person is moving to be delivered in pulses that are synchronized with the opening of the shudder.

10. The facial image capture system of claim 1 wherein the camera control system:
continually determines which of the video cameras is best positioned for capturing sequential images of the face of the first person and which of the video cameras is best positioned for capturing the face of the second person based on the information about the location of a markers; and
automatically adjusts both the horizontal and vertical direction to which each video camera is directed based on this continual determination so that:
   the camera determined to be best positioned for capturing images of the face of the first person captures images of the face of the first person while the first person is moving; and
   the camera determined to be best positioned for capturing images of the face of the second person captures images of the face of the second person while the second person is moving.

11. The facial image capture system of claim 1 wherein:
the multiple video cameras include at least four video cameras; and
the camera control system automatically adjusts both the horizontal and vertical direction to which the video cameras are directed based on the information about the location of the markers so as to cause:
   the sequential images of at least two of the video cameras to be of the face of the first person from different perspectives; and
   the sequential images of at least two of the video cameras to be of the face of the second person from different perspectives.

12. The facial image capture system of claim 1 wherein the information about the position of the markers is used by the camera control system to predict which of the video cameras will be able to see the face of each of the persons, notwithstanding occlusions that will block the view of others of the cameras.

13. The facial image capture system of claim 1
wherein the information about the position of the markers is used by the camera control system to cause:
a first of the video cameras but not a second of the video cameras to capture sequential images of the face of the first person during a first time period; and
the second of the video cameras but not the first of the video cameras to capture sequential images of the face of the first person during a second time period.

* * * * *